S. W. EMERY.

Improvement in Railway-Track Clearers.

No. 132,715.                                        Patented Nov. 5, 1872.

Witnesses.                                          Inventor:

UNITED STATES PATENT OFFICE.

SAMUEL W. EMERY, OF PORTLAND, MAINE.

IMPROVEMENT IN RAILWAY-TRACK CLEARERS.

Specification forming part of Letters Patent No. 132,715, dated November 5, 1872; antedated October 30, 1872.

*To all whom it may concern:*

Be it known that I, SAMUEL W. EMERY, of Portland, in the county of Cumberland, State of Maine, have invented a new and useful Railroad-Track Cleaner; and I do hereby declare the following to be a full, clear, and exact description of the same, reference being had to the accompanying drawing forming part of this specification, in which—

Figure 1:
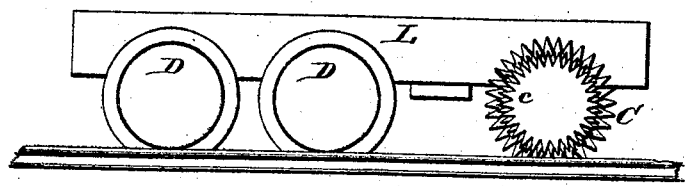
Figure 2:
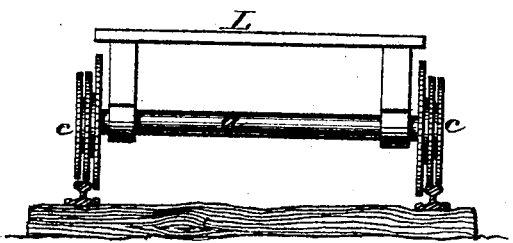
Figure 3:

Figure 1 is a side elevation; Fig. 2, a rear elevation; and Fig. 3, a perspective view, showing a few of the teeth.

Similar letters of reference in the accompanying drawing indicate the same parts.

The object of this invention is to improve the construction of rotary track-cleaners for railroad cars; and to this end the invention consists in constructing such rotary cleaners with a tread and flange exactly similar in arrangement to the tread and flange of ordinary steam-car wheels, and setting both the tread and the flange with sharp projecting spikes, those of the flange projecting beyond those of the tread so as to preserve the general contour of the wheel, as I will now proceed to describe.

In the drawing, L is the frame, and D D the driving-wheels of a locomotive having my improved track-clearing device attached, as shown at C. Of this device, *a* represents the axle, hung in any suitable bearings, and adapted to be removed when not needed, if the proprietors prefer to do so. Upon either end of this axle a flanged wheel, *c*, of similar shape to a common car-wheel, is hung in such a manner that its "tread" will just clear the tread of the rail beneath, while its "flange" will graze the inner side of the rail-head, as shown in Fig. 2. The tread of this wheel is provided with two or more rows of sharp-pointed teeth, arranged in any suitable manner, and the flange is composed of one or more rows of the same kind of teeth, as shown. Another row or two may be provided inside the flanges, if preferred, to assist them and relieve them from too severe a strain. The teeth may be beveled or sharpened in any suitable form so as to give them at the same time the maximum of strength and of sharpness, and so as to enable them to be ground, filed, or otherwise sharpened, or cut deeper as they wear away. The wheel may be made up of several flat plates bolted together, as shown in the drawing, or it may be cast in one piece, with the row of teeth on the tread and flange, as described.

Having thus described my invention, what I claim is—

As an improved article of manufacture, a wheel for cleaning ice from railroad tracks, constructed with a flat or inclined tread and a projecting inside flange, in the manner of an ordinary car-wheel, the tread and the flange being both thickly set with sharp spikes, substantially as described, for the purposes specified.

SAMUEL W. EMERY.

Witnesses:
NATHAN K. ELLSWORTH,
M. CHURCH.